US010105685B2

(12) United States Patent
Park et al.

(10) Patent No.: US 10,105,685 B2
(45) Date of Patent: Oct. 23, 2018

(54) PREPARATION METHOD OF PARTICLE SIZE-CONTROLLED, CHROMIUM OXIDE PARTICLES OR COMPOSITE PARTICLES OF IRON OXIDE-CHROMIUM ALLOY AND CHROMIUM OXIDE

(71) Applicant: Korea Institute of Energy Research, Daejeon (KR)

(72) Inventors: Ji Chan Park, Daejeon (KR); Jung Il Yang, Daejeon (KR); Tak Hyoung Lim, Daejeon (KR); Heon Jung, Daejeon (KR); Shin Wook Kang, Gyeongsangbuk-do (KR)

(73) Assignee: Korea Institute of Energy Research, Daejeon (KR)

( * ) Notice: Subject to any disclaimer, the term of this patent is extended or adjusted under 35 U.S.C. 154(b) by 29 days.

(21) Appl. No.: 15/138,966

(22) Filed: Apr. 26, 2016

(65) Prior Publication Data

US 2017/0113207 A1    Apr. 27, 2017

(30) Foreign Application Priority Data

Oct. 22, 2015 (KR) .................. 10-2015-0147232
Dec. 24, 2015 (WO) ............... PCT/KR2015/014239

(51) Int. Cl.
*C01G 37/02* (2006.01)
*B01J 23/86* (2006.01)
(Continued)

(52) U.S. Cl.
CPC ............. *B01J 23/862* (2013.01); *B01J 23/26* (2013.01); *B01J 35/0006* (2013.01);
(Continued)

(58) Field of Classification Search
CPC ...... B01J 23/862; B01J 23/26; B01J 35/0006; B01J 35/0013; B01J 37/0072; C01B 31/18; C01G 37/033; C01G 37/02; C01G 37/027
See application file for complete search history.

(56) References Cited

U.S. PATENT DOCUMENTS

2013/0341242 A1   12/2013   Park et al.
2015/0298114 A1   10/2015   Park et al.

FOREIGN PATENT DOCUMENTS

KR    101272200 B1    6/2013
KR    101272210 B1    6/2013
(Continued)

OTHER PUBLICATIONS

Decision to Grant issued in corresponding Korean Application No. 10-2015-0147232 dated Jul. 20, 2016 (3 pages).

*Primary Examiner* — James Fiorito
(74) *Attorney, Agent, or Firm* — Osha Liang LLP

(57) ABSTRACT

Provided are particle size-controlled, chromium oxide particles or composite particles of iron oxide-chromium alloy and chromium oxide; a preparation method thereof; and use thereof, in which the chromium oxide particles or the composite particles of iron oxide-chromium alloy and chromium oxide having a desired particle size are prepared in a simpler and more efficient manner by using porous carbon material particles having a large pore volume as a sacrificial template. When the chromium oxide particles or the composite particles of iron oxide-chromium alloy and chromium oxide thus obtained are applied to gas-phase and liquid-phase catalytic reactions, they are advantageous in terms of diffusion of reactants due to particle uniformity, high-temperature stability may be obtained, and excellent reaction results may be obtained under severe reaction environment.

9 Claims, 9 Drawing Sheets

(51) Int. Cl.
   *B01J 23/26*  (2006.01)
   *B01J 35/00*  (2006.01)
   *B01J 37/00*  (2006.01)
   *C01G 37/033* (2006.01)
   *C01B 32/40*  (2017.01)

(52) U.S. Cl.
   CPC ....... *B01J 35/0013* (2013.01); *B01J 37/0072* (2013.01); *C01B 32/40* (2017.08); *C01G 37/02* (2013.01); *C01G 37/033* (2013.01); *C01P 2002/72* (2013.01); *C01P 2004/04* (2013.01); *C01P 2004/51* (2013.01); *C01P 2004/64* (2013.01); *C01P 2004/82* (2013.01)

(56) References Cited

FOREIGN PATENT DOCUMENTS

| | | | | |
|---|---|---|---|---|
| KR | 101342514 B1 | 12/2013 | | |
| KR | 20150022050 A | 3/2015 | | |
| WO | WO2014/098366 | * | 6/2014 | .............. B01J 37/08 |

* cited by examiner

[FIG. 1]
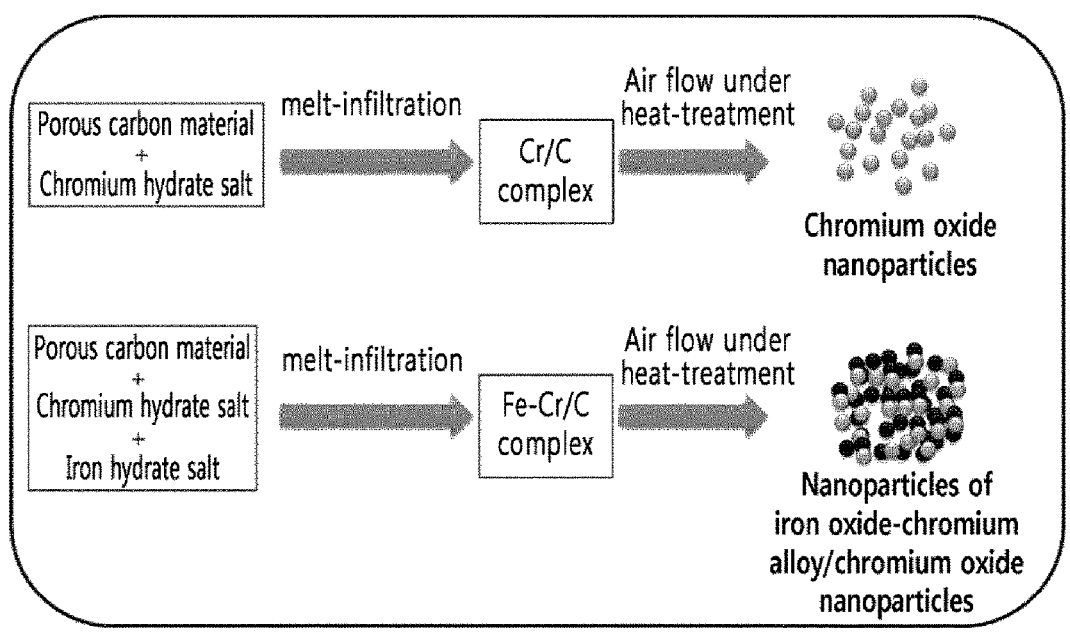

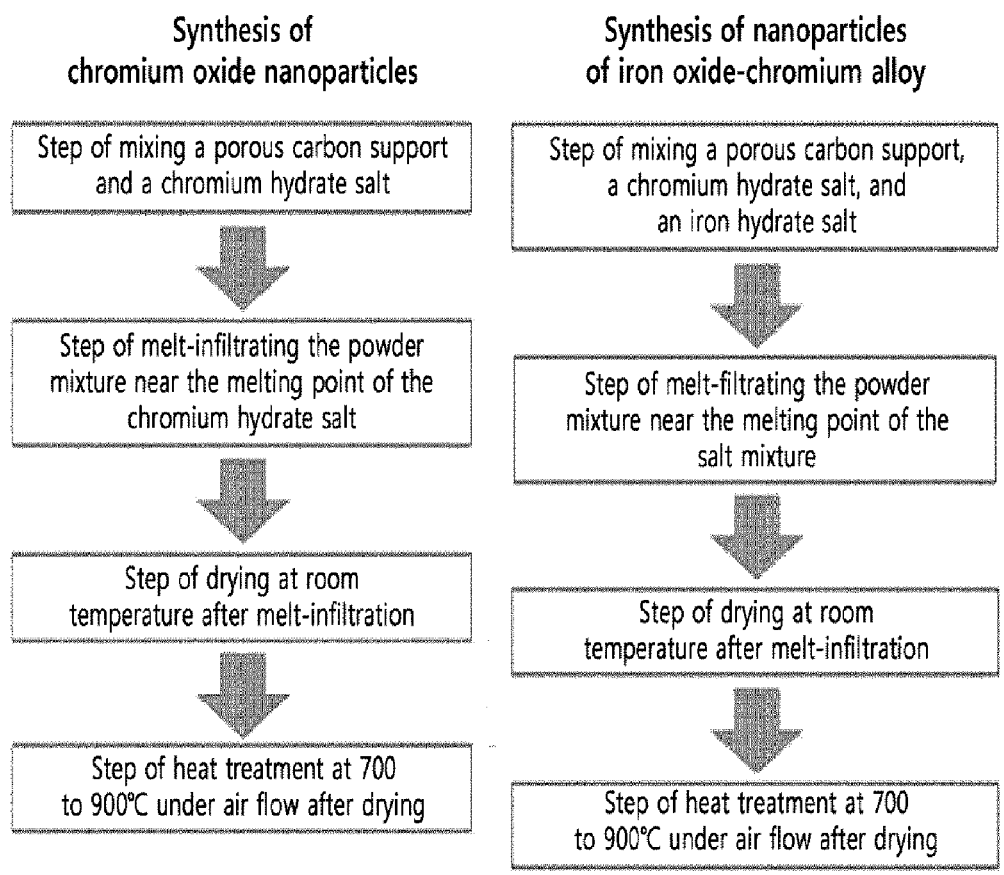
[FIG. 2]

[FIG. 3]
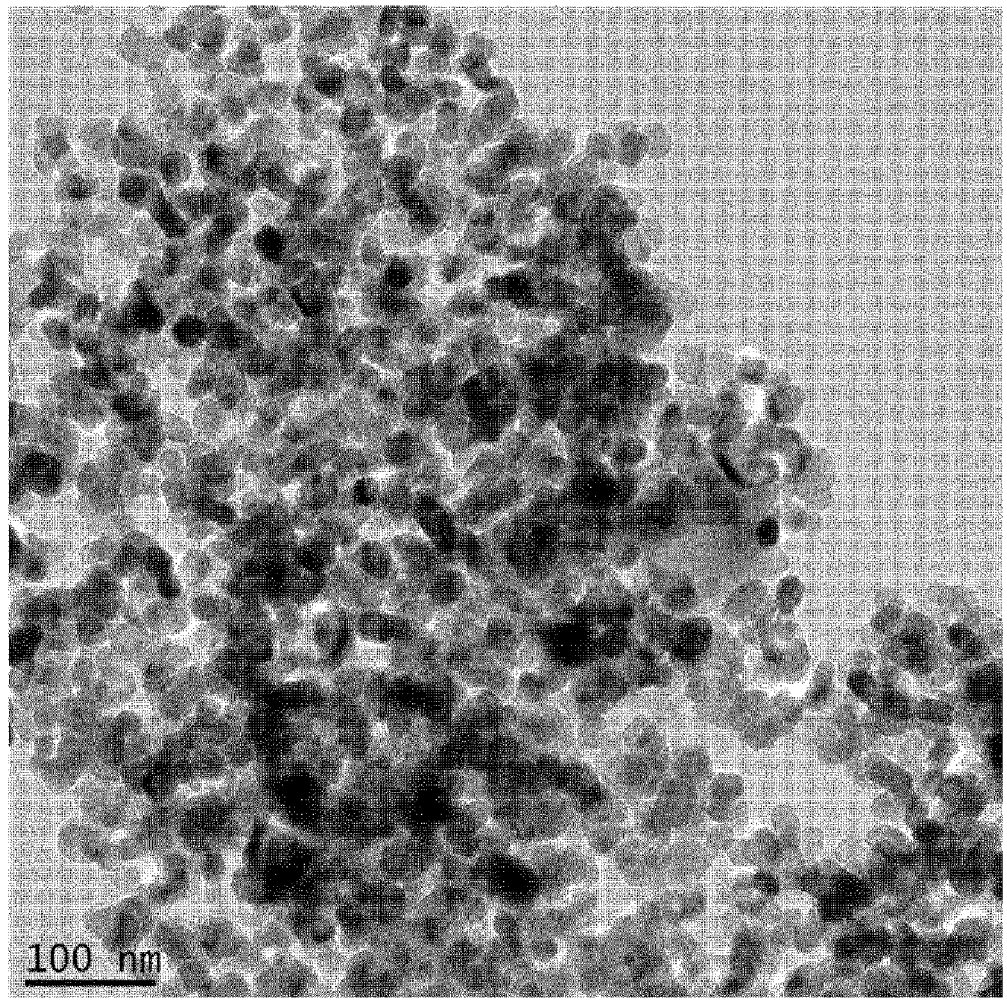

[FIG. 4]
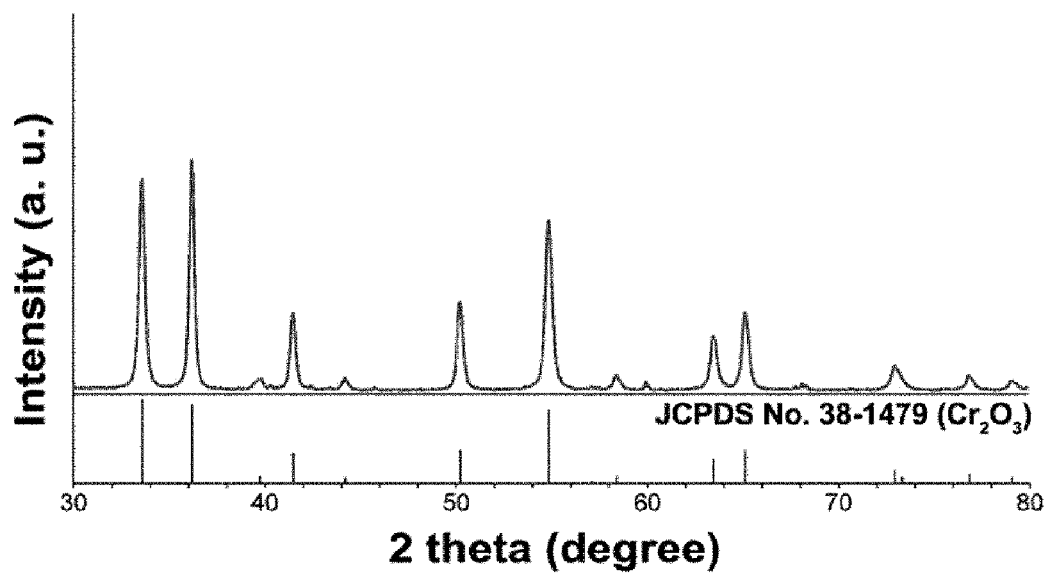

[FIG. 5]
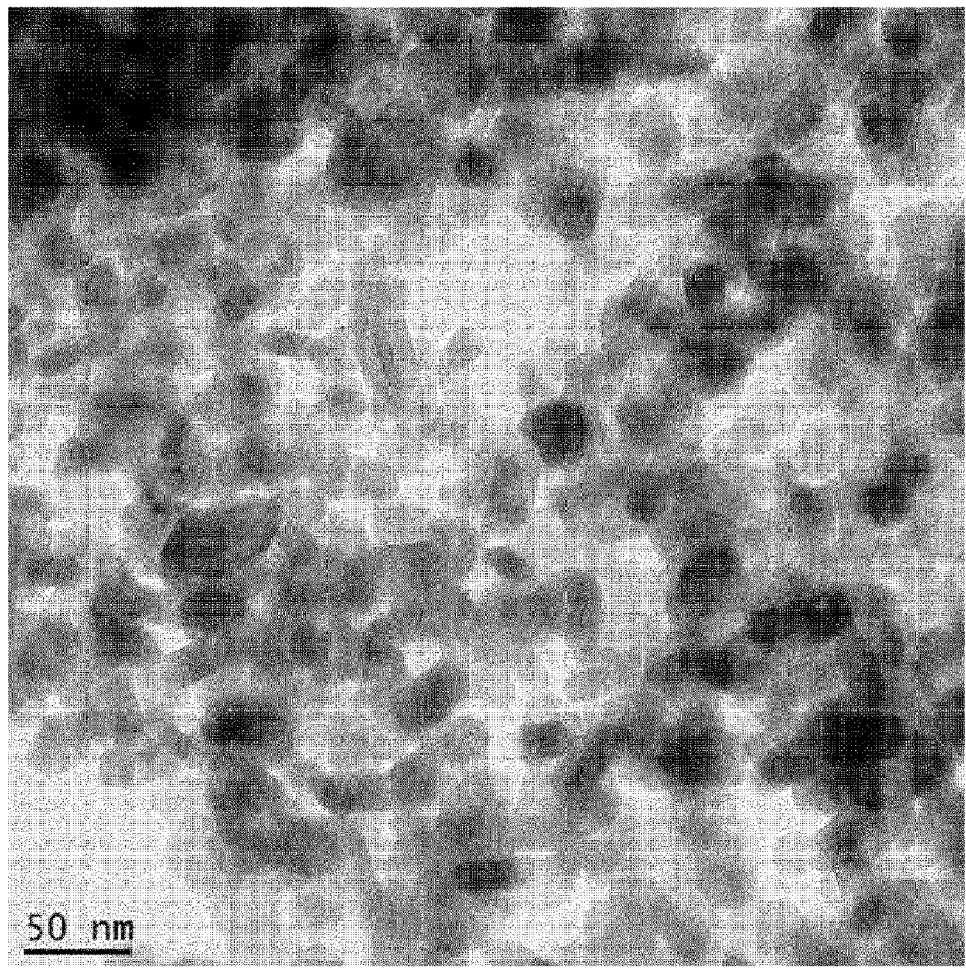

[FIG. 6]
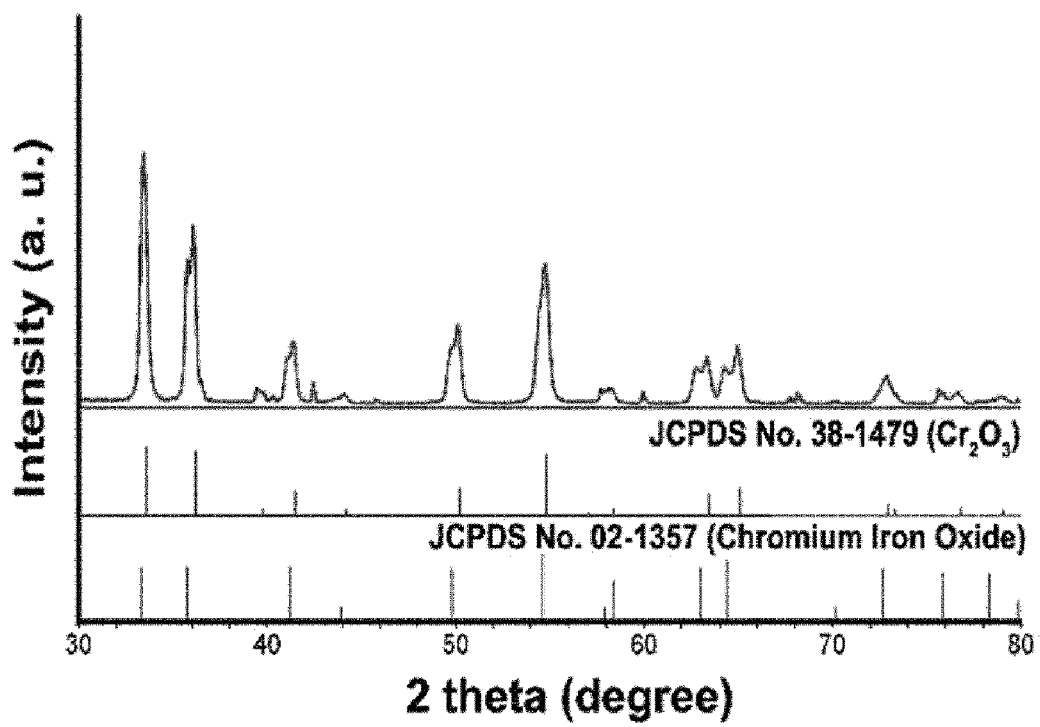

[FIG. 7]
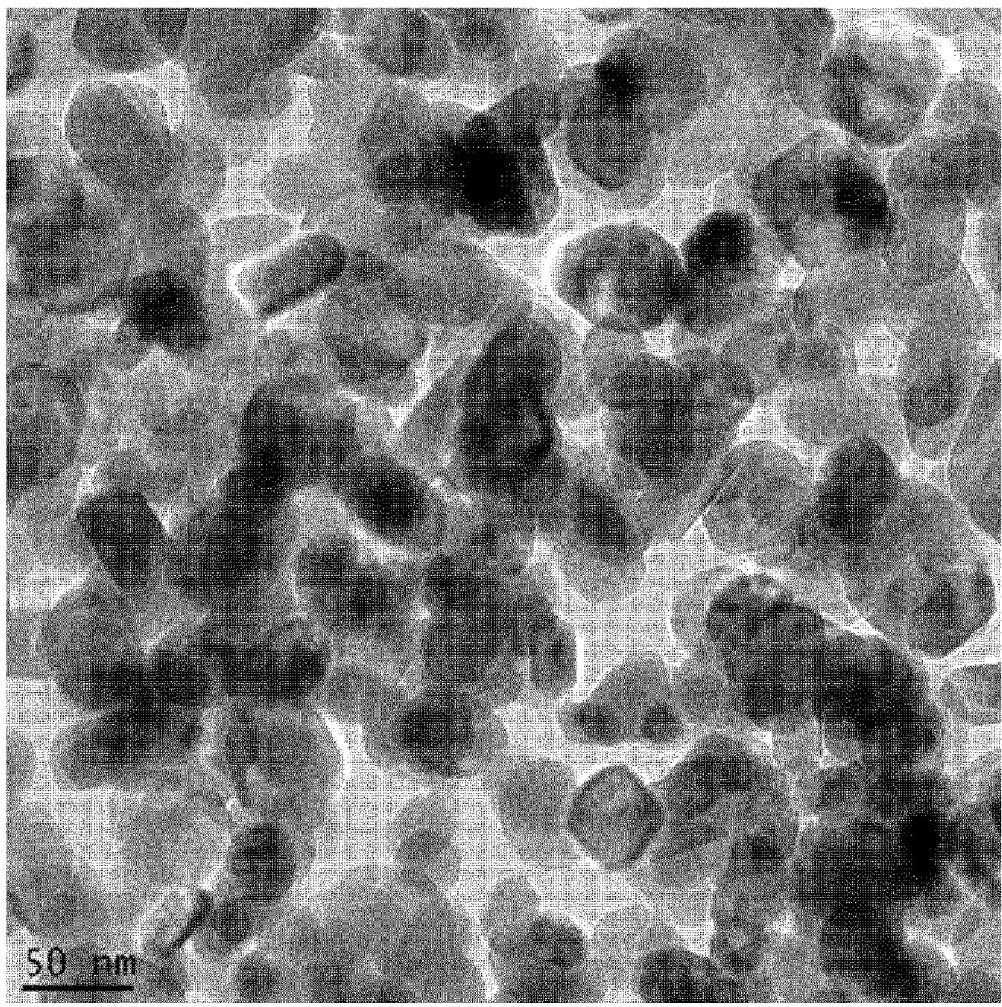

[FIG. 8]
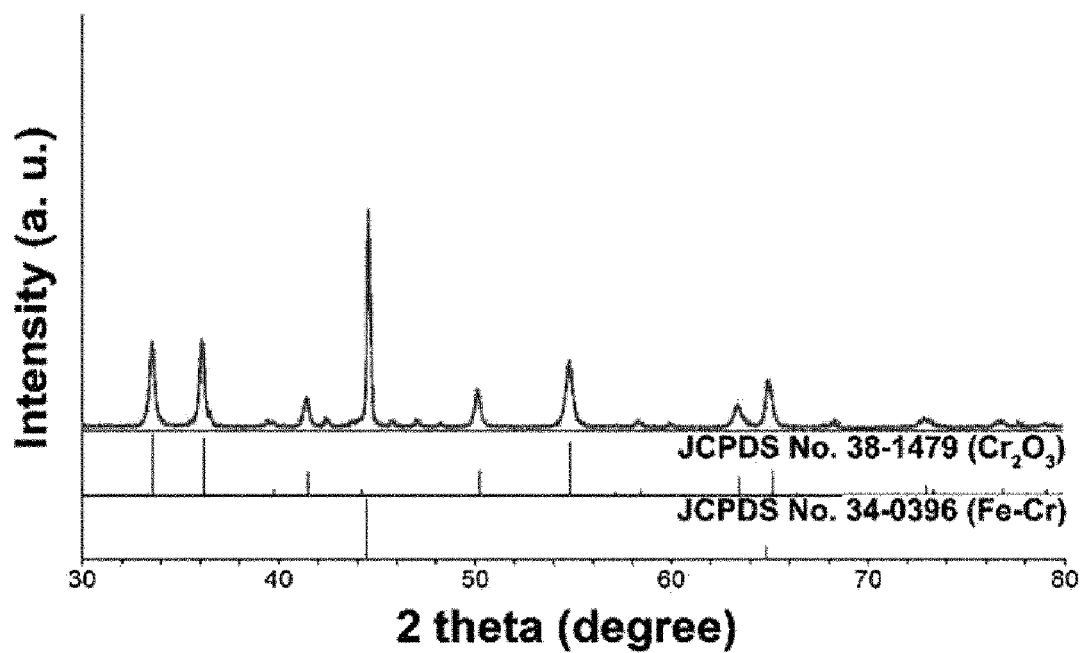

[FIG. 9]
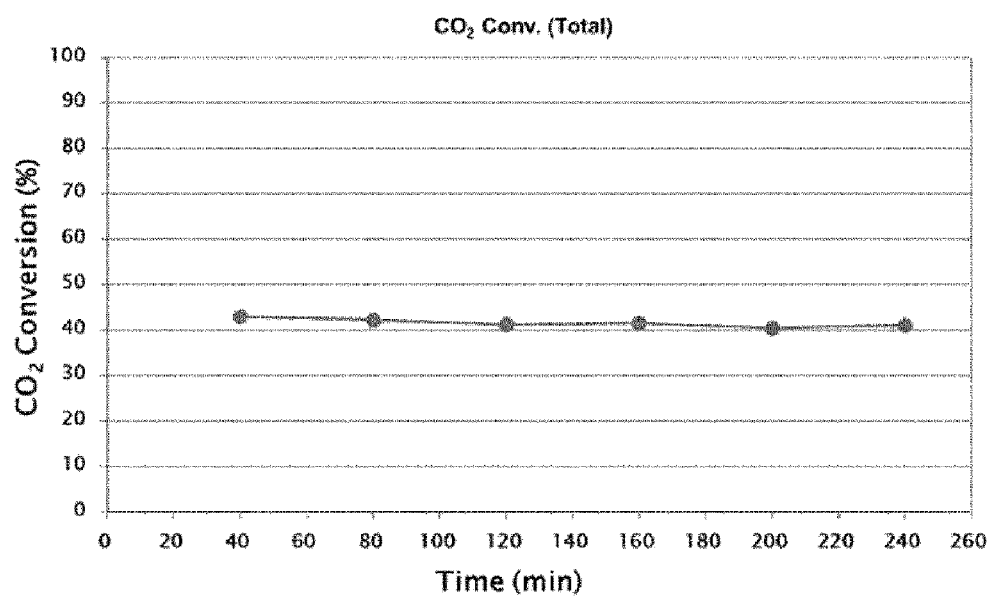
[FIG. 10]
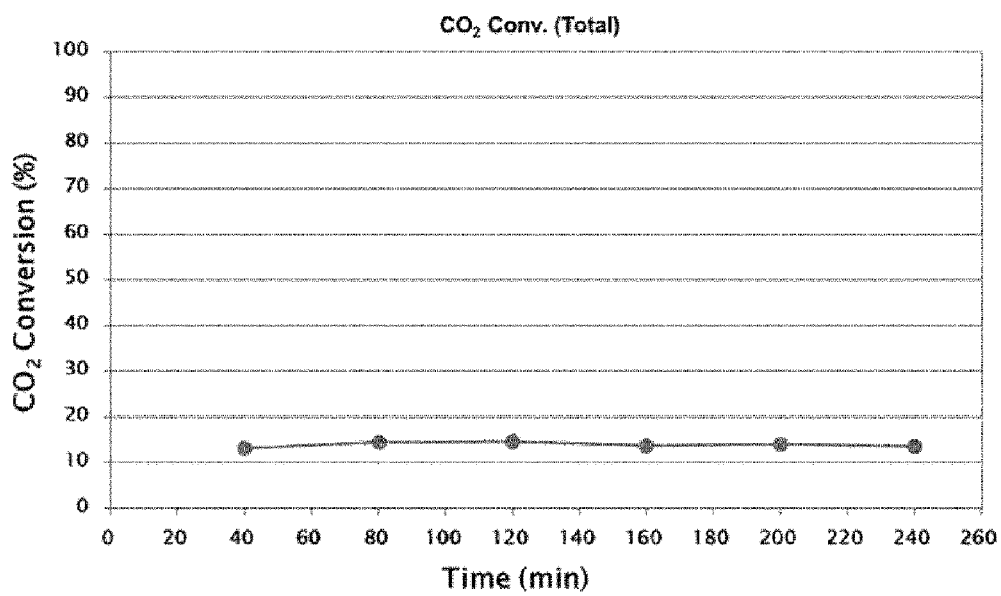

PREPARATION METHOD OF PARTICLE SIZE-CONTROLLED, CHROMIUM OXIDE PARTICLES OR COMPOSITE PARTICLES OF IRON OXIDE-CHROMIUM ALLOY AND CHROMIUM OXIDE

BACKGROUND OF THE INVENTION

1. Field of the Invention

The present disclosure relates to particle size-controlled, chromium oxide particles or composite particles of iron oxide-chromium alloy and chromium oxide; a preparation method thereof; and use thereof.

2. Description of the Related Art

Chromium oxide particles have very high thermal stability and sintering between the particles does not easily occur, and therefore, chromium oxide particles can be very usefully applied to a catalyst or support for high-temperature reactions. However, a synthetic method thereof complex or requires use of environmentally hazardous reagents, and it not easy to obtain small uniform products at a nano level.

Iron oxide and chromium oxide materials can be used as a gas sensor, an electrode material, a catalyst, etc. With regard to catalytic reactions, iron oxide and chromium oxide materials may be applied to the following representative water gas shift (WGS) or reverse water gas shift (RWGS) reaction.

$$CO_2 + H_2 \leftrightarrow CO + H_2O$$

In particular, the reverse water gas shift reaction of producing water and carbon monoxide from carbon dioxide and hydrogen gas is a weak endothermic reaction, and favored at high temperatures. However, nanoparticles used as a catalyst may have lower thermal stability and their sintering may easily occur as their size smaller. To solve this sintering problem, a metal oxide material such as porous silica can be used as a support. However, silica has a disadvantage of being vulnerable to steam, and thus silica is not suitable for use as a support in the high-temperature water gas shift reaction.

Accordingly, chromium oxide nanoparticles being stable against steam or high-temperature reactions have advantages of being suitable for use as a catalyst or support in the high-temperature reverse water gas shift reaction as well as of being used an excellent catalyst in other high-temperature catalytic reactions.

SUMMARY OF THE INVENTION

An object of the present invention is to provide a method of preparing chromium oxide particles or composite particles of iron oxide-chromium alloy and chromium oxide having a uniform particle size of several tens of nanometers in a simpler and more efficient manner.

BRIEF DESCRIPTION OF THE DRAWINGS

FIG. 1 illustrates a preparation of chromium oxide particles or composite particles of iron oxide-chromium alloy and chromium oxide using a porous carbon structure as a sacrificial template according to the present invention;

FIG. 2 is a flow chart showing a schematic illustration of a preparation process of chromium oxide particles or composite particles of iron oxide-chromium alloy and chromium oxide according to the present invention;

FIG. 3 shows a TEM image of chromium oxide particles prepared in an exemplary embodiment of the present invention;

FIG. 4 shows an XRD spectrum of chromium oxide particles prepared in an exemplary embodiment of the present invention;

FIG. 5 shows a TEM image of composite particles of iron oxide-chromium alloy and chromium oxide prepared in an exemplary embodiment of the present invention;

FIG. 6 shows an XRD spectrum of composite particles of iron oxide-chromium alloy and chromium oxide prepared in an exemplary embodiment of the present invention;

FIG. 7 shows a TEM image of composite particles of iron oxide-chromium alloy and chromium oxide prepared in an exemplary embodiment of the present invention after high-temperature heat treatment at 800° C. for 4 hours;

FIG. 8 shows an XRD spectrum of composite particles of iron oxide-chromium alloy and chromium oxide prepared in an exemplary embodiment of the present invention after high-temperature heat treatment at 800° C. for 4 hours;

FIG. 9 shows a carbon dioxide conversion rate over time when a reverse water gas shift reaction was performed at 700° C. using chromium oxide particles prepared in an exemplary embodiment of the present invention; and FIG. 10 shows a carbon dioxide conversion rate over time when a reverse water gas shift reaction was performed at 700° C. under catalyst-free conditions in Comparative Example.

DETAILED DESCRIPTION OF THE PREFERRED EMBODIMENTS

A first aspect of the present invention provides a method of preparing particle size-controlled chromium oxide particles, the method including Step 1a of preparing porous carbon material particles having a pore volume of 0.3 cm$^3$/g or more; Step 2a of mixing a chromium hydrate salt and the porous carbon material particles; Step 3a of melt-infiltrating the chromium hydrate salt into pores of the porous carbon material particles at a temperature at which the chromium hydrate salt may be melted; and Step 4a of calcining the chromium hydrate salt and the porous carbon material at a high temperature of 700 to 900° C. to form chromium oxide particles, of which particle size is controlled by the pores of the porous carbon material, and also removing the porous carbon material by pyrolysis to remain particle size-controlled chromium oxide particles.

A second aspect of the present invention provides chromium oxide particles prepared by the method of the first aspect, in which the chromium oxide particles are composed of a chromium oxide crystalline phase and their particle size is uniformly controlled in several tens of nanometers of 10 nm to 50 nm.

A third aspect of the present invention provides a method of preparing particle size-controlled composite particles of iron oxide-chromium alloy and chromium oxide, the method including Step 1b of preparing porous carbon material particles having a pore volume of 0.3 cm$^3$/g or more; Step 2b of mixing a chromium hydrate salt, an iron hydrate salt, and the porous carbon material particles; Step 3b of melt-infiltrating the chromium hydrate salt and the iron hydrate salt into pores of the porous carbon material particles at a temperature at which the chromium hydrate salt and the iron hydrate salt may be melted; and Step 4b of calcining the chromium hydrate salt, the iron hydrate salt, and the porous carbon material at a high temperature of 700 to 900° C. to form iron oxide-chromium alloy particles and chromium oxide particles, of which particle sizes are controlled by the pores of the porous carbon material, and also removing the porous carbon material by pyrolysis to remain particle size-controlled composite particles, in which an iron oxide-chromium alloy crystalline phase and a chromium oxide crystalline phase coexist.

A fourth aspect of the present invention provides composite particles of iron oxide-chromium alloy and chromium oxide prepared by the method of the third aspect, in which the iron oxide-chromium alloy crystalline phase and the chromium oxide crystalline phase coexist and their particle size is uniformly controlled in several tens of nanometers of 10 nm to 50 nm.

A fifth aspect of the present invention provides a catalyst for reverse water gas shift reaction, the catalyst including the chromium oxide particles according to the second aspect or the composite particles of iron oxide-chromium alloy and chromium oxide according to the fourth aspect.

A sixth aspect of the present invention provides a method of preparing carbon monoxide from a carbon dioxide-containing gas in a carbon dioxide conversion rate of 40% or higher, the method including the steps of i) applying the catalyst for reverse water gas shift reaction according to the fifth aspect to a reverse water gas shift reactor; and ii) providing a gas containing carbon dioxide and hydrogen to the reactor to allow reverse water gas shift reaction by the catalyst.

Hereinafter, the present invention will be described in detail.

Until now, chromium oxide particles have been applied to various fields such as hydrogen storage, catalysts, coating materials, dyes, electric device, drug transfer, etc., and chromium oxide particles have been prepared by various methods including hydrothermal reaction, pyrolysis, combustion, a sol-gel method, a precipitation method, etc. However, there have been drawbacks that it is difficult to obtain uniform particles of several tens of nanometers, and a process of melting silica is required when a highly porous material such as silica is used as a template, leading to a complicated process.

In the present invention, it was found that when porous carbon material particles having a pore volume of 0.3 cm$^3$/g or more are used as a sacrificial template, and a chromium hydrate salt is filled into pores of the porous carbon material particles by melt-infiltration, followed by calcining for substantially complete removal of the template, a large amount of the chromium hydrate salt is infiltrated into the pores of the porous carbon material particles, not the surface thereof, and therefore, during production of the chromium oxide particles in the subsequent calcination process, their particle size may be easily controlled in several tens of nanometers.

When the chromium hydrate salt is infiltrated into pores of the porous carbon material particles by the known infiltration method using a solvent, it is difficult to infiltrate a desired amount of the chromium hydrate salt due to dilution by the solvent, and therefore, after calcination, size control of the chromium oxide particles is difficult. In contrast, in the present invention, the porous carbon material particles having a large pore volume are selected and solvent-free melt-infiltration of the chromium hydrate salt is performed to fill the pores of the porous carbon material particles with the chromium hydrate salt at a maximum amount corresponding to the pore size, unlike the known solvent infiltration method, followed by high-temperature calcination at 700° C. or higher. Accordingly, chromium oxide particles having a uniform particle size of several tens of nanometers may be prepared in a large amount.

Further, when metal oxide particles are generally formed by calcining a metal hydrate salt at a high temperature to degrade the hydrate salt, sintering between metal oxide particles occurs at an extremely high temperature of 700° C. or higher to cause agglomeration of particles, and therefore, it is difficult to prepare uniform particles having a relatively small particle size of several tens of nanometers. In the present invention, however, it was found that the chromium hydrate salt is melt-infiltrated into the porous carbon material as the sacrificial template, and then the porous carbon material is completely removed by calcination at a high temperature of 700 to 900° C. to prepare uniform particles of several tens of nanometers of 10 nm to 50 nm without sintering between chromium oxide particles. Furthermore, it was found that when the chromium hydrate salt may be mixed with an iron hydrate salt, it is possible to prepare composite particles, in which an iron oxide-chromium alloy crystalline phase and a chromium oxide crystalline phase coexist, the composite particles having a particle size controlled by the pore size of the porous carbon material particle, for example, a desired particle size of several tens of nanometers of 10 nm to 50 nm. The present invention is based on this finding.

That is, the present invention is characterized in that when a method of using a porous carbon material having a large pore volume as a template, infiltrating hydrate salt-type precursors thereinto, and then completely removing the template by calcination at a high temperature of 700° C. or higher, preferably 700 to 900° C. is applied to the preparation of chromium metal-containing metal oxide particles, particles having a uniform particle size of several tens of nanometers, that is, particles having monodispersity may be prepared in a simpler and more efficient manner.

The method of preparing the particle size-controlled chromium oxide particles according to the present invention includes Step 1a of preparing porous carbon material particles having a pore volume of 0.3 cm$^3$/g or more;

Step 2a of mixing a chromium hydrate salt and the porous carbon material particles;

Step 3a of melt-infiltrating the chromium hydrate salt into pores of the porous carbon material particles at a temperature, at which the chromium hydrate salt may be melted; and Step 4a of calcining the chromium hydrate salt and the porous carbon material at a high temperature of 700 to 900° C. to form chromium oxide particles, of which particle size controlled by the pores of the porous carbon material, and also removing the porous carbon material by pyrolysis to remain particle size-controlled chromium oxide particles (FIGS. 1 and 2).

Preferably, the method of preparing the chromium oxide particles according to the present invention may further include Step 3a-1 of drying the porous carbon material particles, into which the chromium hydrate salt is melt-infiltrated, between Step 3a and Step 4a (FIG. 2).

According to the preparation method of the present invention, provided are chromium oxide particles composed of a chromium oxide crystalline phase, in which the particles have a uniform controlled particle size of several tens of nanometers of 10 nm to 50 nm.

In the present invention, the chromium oxide particles may have monodispersity. Preferably, coefficient of variation (CV) of the particle size of the chromium oxide particles may be 0.3 or less, for example, 0.001 to 0.3, preferably 0.01 to 0.2.

As used herein, the term "coefficient of variation (CV)" means a value obtained by dividing standard deviation by an arithmetic mean. Therefore, coefficient of variation regarding the particle size may be defined by the following Mathematical Equation 1:

$$CV = (\text{standard deviation of particle size/mean particle size})$$ [Mathematical Equation 1]

The method of preparing particle size-controlled composite particles of iron oxide-chromium alloy and chromium oxide includes Step 1b of preparing porous carbon material particles having a pore volume of 0.3 cm$^3$/g or more;

Step 2b of mixing a chromium hydrate salt, an iron hydrate salt, and the porous carbon material particles;

Step 3b of melt-infiltrating the chromium hydrate salt and the iron hydrate salt into pores of the porous carbon material particles at a temperature, at which the chromium hydrate salt and the iron hydrate salt may be melted; and Step 4b of calcining the chromium hydrate salt, the iron hydrate salt, and the porous carbon material at a high temperature of 700 to 900° C. to form iron oxide-chromium alloy particles and chromium oxide particles, of which particle sizes are controlled by the pores of the porous carbon material, and also removing the porous carbon material by pyrolysis to remain particle size-controlled composite particles, in which an iron oxide-chromium alloy crystalline phase and a chromium oxide crystalline phase coexist (FIGS. 1 and 2).

Preferably, the method of preparing particle size-controlled composite particles of iron oxide-chromium alloy and chromium oxide according to the present invention may further include Step 3b-1 of drying the porous carbon material particles, into which the chromium hydrate salt is melt-infiltrated, between Step 3b and Step 4b (FIG. 2).

According to The preparation method of the present invention, provided are composite particles of iron oxide-chromium alloy and chromium oxide, in which the iron oxide-chromium alloy crystalline phase and the chromium oxide crystalline phase coexist, and the particles have a uniform controlled particle size of several tens of nanometers of 10 nm to 50 nm.

In the present invention, the composite particles may have monodispersity. Preferably, coefficient of variation (CV) of the particle size of the composite particles may be 0.3 or less, for example, 0.001 to 0.3, preferably 0.01 to 0.2.

With regard to the chromium oxide particles or the composite particles of iron oxide-chromium alloy and chromium oxide according to the present invention, their particle size is uniformly controlled in several tens of nanometers of 10 nm so 50 nm to provide a high specific surface area for contact with reactants. Therefore, when the particles are used as catalysts for various applications, they are favorable in terms of catalytic performances. In addition, iron oxide and chromium oxide materials are used in a gas sensor, an electrode material, etc. Therefore, when applied to the gas sensor or the electrode material, the chromium oxide particles or the composite particles of iron oxide-chromium alloy and chromium oxide according to the present invention are advantageous in terms of contact efficiency of reactants due to the small uniform particle size of nanometers.

Porous materials are divided into microporous and mesoporous materials depending on the pore size of the material. Generally, porous materials having a pore size of 2 nm or less are called microporous materials and porous materials having a pore size of 2 nm to 50 nm are called mesoporous materials. The porous carbon material of the present invention is not limited to the pore size, but mesoporous materials are preferred for the preparation of nano-sized metal-containing particles. In particular, in order to obtain the chromium oxide particles or the composite particles of iron oxide-chromium alloy and chromium oxide having an average particle size of several tens of nanometers of 10~50 nm, the average particle size of the porous carbon material particle may be preferably 2 to 50 nm, and more preferably 10~50 nm.

As described above, the pore volume of the porous carbon material particle may be preferably 0.3 cm$^3$/g, specifically 0.3 to 30 cm$^3$/g.

Non-limiting examples of the porous carbon material may include activated carbon, activated charcoal, a synthetic porous carbon support (CMK), a mixture thereof, etc. Specific examples of the synthetic porous carbon support. (CMK) may include CMK-3, CMK-8, etc.

It is more preferable that the pore size of the porous carbon material particle is more uniform.

"CMK-3" is a porous carbon material, synthesized from mesoporous silica SBA-15, having hexagonal pores and a long cylindrical shape in the axial direction. "CMK-8" is a porous carbon material, synthesized from mesoporous silica KIT-6, having a cubic structure formed by two kinds of mesopores three-dimensionally connected.

"Activated carbon" is a material having strong adsorption capacity, and mainly composed of carbonaceous material. Activated carbon is a porous amorphous carbon formed by complex combination of graphite-like crystallites in the plane surface. In the present invention, activated carbon having an average pore diameter of 2 nm to 50 nm and a specific surface area of 500 m$^2$/g to 1500 m$^2$/g may be used.

The porous carbon material particle may have an average size in a micrometer scale, such as 0.2 μm to 200 μm. The size of the final product may be controlled by controlling the size of the porous carbon material particles.

Meanwhile, the chromium hydrate salt and the iron hydrate salt is a metal source having a lower melting point than metal oxide generally used as a support. In the present invention, it is preferable to use the chromium hydrate salt and the iron hydrate salt having a melting point of 30~100° C., respectively.

Specifically, the chromium hydrate salt usable in the present invention may be $Cr(NO_3)_3 \cdot 9H_2O$ (m.p.=60.06° C.), $CrCl_3 \cdot 6H_2O$ (m.p.=83° C.), $Cr_2(SO_4)_3 \cdot 12H_2O$ (m.p.=90° C.), or a combination thereof, but is not limited thereto. Further, the iron hydrate salt usable in the present invention may be $FeSO_4 \cdot 7H_2O$ (m.p.=60-64° C.), $Fe(NO_3)_3 \cdot 9H_2O$ (m.p.=47.2° C.), $FeCl_3 \cdot 6H_2O$ (m.p.=37° C.), or a combination thereof, but is not limited thereto.

Step 2 of mixing the chromium hydrate salt or the mixture of the chromium hydrate salt and the iron hydrate salt with the porous carbon material particles is preferably performed after mechanical milling.

Further, when solvent-free mixing is performed to form a powder mixture, dilution by solvents does not occur, and therefore, solvent-free mixing is advantageous in high supporting and high dispersion of a melt in the pore.

When the mixture of the chromium hydrate salt and the iron hydrate salt is used, a molar ratio of chromium hydrate salt:iron hydrate salt may be 1:0.1 to 1.

Meanwhile, Step 3 of melt-infiltrating the chromium hydrate salt or the mixture of the chromium hydrate salt and the iron hydrate salt into pores of the porous carbon material particle is an easy process, which is advantageous in terms of high dispersion and high supporting of the melt.

Respective metal hydrate salts have intrinsic density values. Therefore, in consideration of the density of a metal hydrate salt and the pore volume of a porous carbon material, a melt of the salt may be infiltrated more uniformly.

Therefore, the respective metal hydrate salts may be added in consideration of the density of the respective metal salts and the more volume of the porous carbon material. For uniformity of the formed particles, it is preferable that the chromium hydrate salt or the mixture of the chromium hydrate salt and the iron hydrate salt preferably melt-infiltrated in an amount of 0.3~3 gram per unit gram (g) of carbon.

The melt-infiltration process may be performed around a melting point of the salt mixture. The accurate melting point of the hydrate salt mixture may be determined by DSC (Differential scanning calorimetry). More easily, of the mixed salts, the salt having a higher melting point may be considered as a reference of temperature for infiltration.

For sufficient melting and supporting of the metal hydrate salts, it is important to control a temperature and maintain a pressure in a reactor. Further, reactions may be allowed to proceed in the closed system such that a pressure caused by a steam pressure generated during the reactions may not become extinct. Reaction time may be about 4~48 hours, preferably about 24~48 hours to allow sufficient melt-infiltration of the salts into the pores.

The reactor used in the melt-infiltration is preferably a plastic reactor formed of polypropylene or Teflon, because the plastic reactor is transparent to be easily observed and its mass-production is convenient.

Before calcination, porous carbon material particles, into which the chromium hydrate salt, or the mixture of the chromium hydrate salt and the iron hydrate salt is melt-infiltrated, may be dried, as in Step 3-1. In this regard, the drying is preferably performed at a temperature to prevent decomposition of the infiltrated hydrate salts, for example, room temperature (15 to 35° C.)

On the other hand, Step 4 of calcining the chromium hydrate salt, the iron hydrate salt, and the porous carbon material at a high temperature and under conditions for their pyrolysis is performed to completely remove the porous carbon material used as a template upon the preparation of metal oxide particles and to form chromium oxide particles or composite particles, in which an iron oxide-chromium alloy crystalline phase and a chromium oxide crystalline phase coexist, by pyrolysis of the chromium hydrate salt or the mixture of the chromium hydrate salt and the iron hydrate salt, respectively. After complete pyrolysis of the porous carbon materials by Step 4, particle size-controlled, chromium oxide particles or composite particles, in which an iron oxide-chromium alloy crystalline phase and a chromium oxide crystalline phase coexist, are formed in a small size of several tens of micrometers.

In order to decompose metal salt hydrates supported in the porous carbon materials and to completely remove the carbon materials, a high-temperature calcination process must be performed at a temperature of 700° C. or higher under atmosphere or oxygen condition. The heat treatment temperature may be 700° C. or higher, at which metal salts are decomposed and carbon materials are completely removed. When calcination is performed at a temperature of 900° C. or higher, particle agglomeration may occur, which is unfavorable when the particles are used as a catalyst. Therefore, a temperature of 700~900° C. is preferred.

The calcination is preferably performed under atmosphere in consideration of cost and stability, but the calcination may be also performed using pure oxygen and mixed oxygen in terms of high reliability.

Since the calcination time affects the amount of carbon to be removed, a time to allow complete removal of carbon may be determined.

Non-limiting example of the calcination time may be 1~24 hours. The heat treatment time may slightly differ depending on a calcination machine. However, when the heat treatment is performed at 700° C. or higher for 1 hour, carbon may be completely removed. The heat treatment time exceeding 24 hours is useless, but may cause agglomeration of particles.

The chromium oxide particles or the composite particles prepared in Step 4 may be in a crystalline phase, leading to excellent stability of particles even at high temperature.

The present invention is advantageous in the preparation of single metal oxide particles which are composed of only chromium oxide and have a uniform particle size of several tens of nanometers, but the present invention also provides a method capable of preparing composite particles by more easily preparing alloys of iron oxide and chromium oxide. The alloys of iron oxide and chromium oxide may be provided with high-temperature stability of iron oxide as well as high-temperature stability of chromium oxide itself, and thus the method of the present invention may have various applications, in which alloy particles of chromium oxide and iron oxide are required and high-temperature stability are required. For example, use of chromium oxide as a catalyst and iron oxide as a cocatalyst for improving catalytic activity of chromium oxide may be particularly preferred.

The chromium oxide particles or the composite particles of iron oxide-chromium alloy and chromium oxide of the present invention may applied to hydrogen storage materials, sensor materials, adsorbents, coating materials, dyes, electrode materials, drug vehicles, etc., depending on the kind of metal oxide included in the particles.

In particular, when the chromium oxide particles or the composite particles of iron oxide-chromium alloy and chromium oxide may be used as a catalyst to be applied to gas-phase and liquid-phase catalytic reactions, the particles of the present invention are advantageous in terms of diffusion of reactants due to the small particle size of several tens of nanometers, high-temperature stability may be obtained due to the characteristic of chromium oxide, and excellent reaction results may be obtained under severe reaction environment. Specifically, in a reverse water gas shift reaction of requiring a high temperature condition of 700° C. or higher, hot spot may be formed during reaction. However, a problem of agglomeration of neighboring catalyst nanoparticles may be prevented due to chromium metal-containing oxide.

Further, when the particles having the uniform size of several tens of nanometers are applied to high-temperature reverse water gas shift reaction, the reaction may proceed in the presence of a very small amount of the catalyst, and therefore, the particles are expected as a highly active catalyst of a compact type reactor.

That is, according to the present invention, carbon monoxide may be effectively prepared in a high carbon dioxide conversion rate (close to an equilibrium conversion of the corresponding temperature) by using the chromium oxide particles or the composite particles of iron oxide-chromium alloy and chromium oxide as a catalyst. In detail, the chromium oxide particles or the composite particles of iron oxide-chromium alloy and chromium oxide as a catalyst are injected into a reverse water gas shift reactor, and then a carbon dioxide-containing gas is injected thereto, thereby preparing carbon monoxide by a reverse water gas shift reaction. In this regard, when the reverse water gas shift reaction is performed using the composite particles of iron oxide-chromium alloy and chromium oxide as the catalyst, chromium oxide acts as a main catalyst and iron oxide acts as a cocatalyst, thereby further improving the carbon dioxide conversion rate.

In a preferred embodiment, a method of preparing carbon monoxide from carbon dioxide-containing gas according to the present invention is a method of preparing carbon monoxide from carbon dioxide-containing gas in a carbon dioxide conversion rate of 40% or more, and the method may include Step i) of applying a catalyst for reverse water gas shift reaction including the chromium oxide particles or the composite particles of iron oxide-chromium alloy and chromium oxide to a reverse water gas shift reactor; and Step ii) of providing a gas containing carbon dioxide and hydrogen for the reverse water gas shift reactor to allow a reverse water gas shift reaction by the catalyst for reverse water gas shift reaction.

In the present invention, Step ii) may be performed under a temperature condition of 600 to 900° C. If the reaction temperature is lower than 600° C., the carbon dioxide conversion rate may decrease, and if the reaction temperature is higher than 900° C., stability of the catalyst may decrease.

In the present invention, Step ii) may be performed at a molar ratio of carbon dioxide:hydrogen($CO_2/H_2$) of 1:0.5 to 2. If the molar ratio of carbon dioxide:hydrogen($CO_2/H_2$) is not within the above range, the carbon dioxide conversion rate may decrease.

In the present invention, Step ii) may be performed at a gas hourly space velocity (GHSV) of 10 to 100 $NL \cdot g_{cat}^{-1} \cdot h^{-1}$. If the gas hourly space velocity is not within the above range, the carbon dioxide conversion rate may decrease.

Hereinafter, the present invention will be described in more detail with reference to Examples. However, these Examples are for illustrative purposes only, and the scope of the invention is not intended to be limited by these Examples.

EXAMPLE 1

Synthesis of $Cr_2O_3$ Nanoparticles

To obtain highly dispersed nanoparticles, commercial activated carbon (Sigma-Aldrich, U.S.A.) having excellent physical properties of a PET specific surface area (SSA) of 1010 $m^2/g$ and a pore volume of 0.85 $cm^3/g$ was used as a sacrificial template.

First, 2.5 g of $Cr(NO_3)_3 \cdot 9H_2O$ (Aldrich, 99%, m.p.=47° C., d=1.68 $g/cm^3$, fw=404 g/mol) and 2.0 g of activated carbon were uniformly grinded using a mortar. Thereafter, the powder mixture was placed in a polypropylene container of 30 mL-volume, a cap of the container is tightened, and then placed and stored in a dry oven set at 60° C. for 24 hours. 24 hours later, the powder mixture was cooled at room temperature, dried, and then heat-treated in a calcination oven at an air flow rate of 200 mL/min and 800° C. for 4 hours to completely remove carbon. Consequently, $Cr_2O_3$ nanoparticles were obtained.

A TEM (Transmission electron microscopy) image of $Cr_2O_3$ nanoparticles is given in FIG. 3. FIG. 3 shows that relatively uniform. $Cr_2O_3$ nanoparticles were obtained at a small particle size of 15-30 nm. Further, a crystalline phase of the $Cr_2O_3$ nanoparticles thus obtained was analyzed by XRD spectrum analysis of $Cr_2O_3$ nanoparticles. As a result, their crystalline phase was consistent with a crystalline phase of $Cr_2O_3$ (JCPDS No. 38-1479) previously reported (FIG. 4).

EXAMPLE 2

Synthesis of $Fe_2Cr_2O_3/Cr_2O_3$ Composite Nanoparticles

The same commercial activated carbon as in Example 1 was used as a sacrificial template to synthesize $Fe_2Cr_2O_3/Cr_2O_3$ composite nanoparticles as follows.

First, 1.2 g (3 mmol) of $Cr(NO_3)_3 \cdot 9H_2O$ (Aldrich, 99%, m.p.=47° C., d=1.68 $g/cm^3$, fw=404 g/mol) and 7.95 g (1.5 mmol) of $Fe(NO_3)_3 \cdot 9H_2O$ (Aldrich, ACS reagent=98%, m.p.=55° C., fw=291.03 g/mol were uniformly mixed with. 2.0 g of activated carbon powder. Thereafter, the powder mixture was placed in a polypropylene container of 30 mL-volume, a cap of the container is tightened, and then placed and stored in a dry oven set at 60° C. for 24 hours. 24 hours later, the powder mixture was cooled at room temperature, dried, and then heat-treated in a calcination oven at an air flow rate of 300 mL/min and 800° C. for 4 hours to completely remove carbon. Consequently, $Fe_2Cr_2O_3/Cr_2O_3$ composite nanoparticles were obtained.

A TEM (Transmission electron microscopy) image of $Fe_2Cr_2O_3/Cr_2O_3$ composite nanoparticles is given in FIG. 5. FIG. 5 shows that relatively uniform $Fe_2Cr_2O_3/Cr_2O_3$ composite nanoparticles were obtained at a small particle size of 15-30 nm. Further, a crystalline phase of the $Fe_2Cr_2O_3/Cr_2O_3$ composite nanoparticles thus obtained was analyzed by XRD spectrum analysis of $Fe_2Cr_2O/Cr_2O_3$ composite nanoparticles. As a result, it was found that a crystalline phase of $Fe_2Cr_2O_3$ (JCPDS No. 02-1357) and a crystalline phase of $Cr_2O_3$ (JCPDS No. 38-1479) coexist as previously reported (FIG. 6).

EXAMPLE 3

Thermal Stability Test of $Fe_2Cr_2O_3/Cr_2O_3$ Composite Nanoparticles

The $Fe_2Cr_2O_3/Cr_2O_3$ composite nanoparticle obtained in Example 2 were further heat-treated in a calcination oven at a hydrogen flow rate of 300 mL/min and 800° C. for 4 hours, and then changes in reduced particles were analyzed by TEM and XRD.

The results are given in FIGS. 7 and 8.

FIGS. 7 and 8 show that there were no changes in the particle structure of $Fe_2Cr_2O_3/Cr_2O_3$ composite nanoparticles even after heat treatment at a high temperature of 800° C. and for a long time of 4 hours, suggesting that when $Fe_2Cr_2O_3/Cr_2O_3$ composite nanoparticles are used as a catalyst for high temperature reactions, they are more stably maintained for a long time without structural changes to maintain catalytic performances for a long time.

EXAMPLE 4

Performance Test of $Cr_2O_3$ Nanoparticles and $Fe_2Cr_2O_3/Cr_2O_3$ Composite Nanoparticles as Catalyst in High-Temperature Reverse Water Gas Shift Reaction High-temperature reverse water gas shift reaction was performed using a fixed-bed reactor (inner diameter: 4 mm). In order to measure and control the reaction temperature, a thermocouple was placed in the reactor to control the temperature during reaction. For reaction, a quartz wool was first placed under the catalyst in the reactor, and 0.1 g of $Cr_2O_3$ nanoparticles obtained in Example 1 was loaded thereon. Before reaction, no additional reduction process was performed, and reaction was actually allowed at 700° C. and at a molar ratio of hydrogen:carbon dioxide ($CO_2$) of 1:1. In this regard, an actual flow rate of hydrogen and $CO_2$ was 50 mL/min, and GHSV was 60 $NL \cdot g_{cat}^{-1} \cdot h^{-1}$, respectively. During 4-hr reaction, reactants and products were analyzed by gas chromatography (GC), and water generated during the reaction was collected in a cold trap.

Accurate flow analysis before and after reaction was performed using a wet gas meter in real time, and $CO_2$ conversion rate during the reaction for 4 hours was calculated by the following Mathematical Equation 2, and given in the following Table 1 and FIG. 9.

[Mathematical Equation 2]

$$CO_2 \text{ conversion } (\%) = \frac{\text{injected } CO_2 \text{ mol} - \text{reacted } CO_2 \text{ mol}}{\text{injected } CO_2 \text{ mol}} \times 100 \, (\%)$$

Further, the same experiment was performed at a reaction temperature of 800° C., instead of 700° C., and $CO_2$ conversion rate was examined, and the result is given in the following Table 1.

Furthermore, the same experiment was performed using $Fe_2Cr_2O_3/Cr_2O_3$ composite nanoparticles obtained in Example 2, instead of $Cr_2O_2$ nanoparticles obtained Example 1, and $CO_2$ conversion rate was examined, and the result is given in the following Table 1.

TABLE 1

| Catalyst | Reaction temperature (° C.) | GHSV (NL · $g_{cat}^{-1} \cdot h^{-1}$) | $CO_2$ reaction conversion rate (%) at TOS = 80 min (after 80 minutes) | Equilibrium conversion (%) |
|---|---|---|---|---|
| $Cr_2O_3$ | 700 | 60 | 42% | 45 |
| $Fe_2Cr_2O_3/Cr_2O_3$ | 700 | 60 | 43% | 45 |
| $Cr_2O_3$ | 800 | 60 | 50% | 50 |

As shown in Table 1 and FIG. 9, GC analysis results show that the $CO_2$ conversion rate of $Cr_2O_3$ nanoparticles at 700° C. was about 42% after 80 minutes, which is close to equilibrium conversion of 45% at 700° C. When the experiment was performed under the same reaction conditions, except that the reaction temperature was increased to 800° C., the $CO_2$ conversion rate was which reaches equilibrium conversion.

Further, when the experiment was performed using $Fe_2Cr_2O_3/Cr_2O_3$ composite nanoparticles, $CO_2$ conversion rate (43%) slightly higher than that of pure $Cr_2O_3$ nanoparticle catalyst was observed.

COMPARATIVE EXAMPLE 1

Test of Catalyst-Free High-Temperature Reverse Water Gas Shift Reaction

High-temperature reverse water gas shift reaction was performed in the same manner as in Example 4 without packing the catalyst.

In detail, reaction was allowed at 700° C. and a molar ratio of hydrogen:carbon dioxide ($CO_2$) of 1:1. In this regard, an actual flow rate of hydrogen and $CO_2$ was 50 mL/min, respectively. The $CO_2$ conversion rate during the reaction for 4 hrs was given in FIG. 10.

FIG. 10 shows that in the absence of the catalyst, the $CO_2$ conversion rate at 700° C. was less than 15%. These results confirm performances of the $Cr_2O_3$ nano particles and the $Fe_2Cr_2O_3/Cr_2O_3$ composite nanoparticles of the present invention as catalysts.

EFFECT OF THE INVENTION

The present invention provides a method capable of preparing chromium oxide particles or composite particles of iron oxide-chromium alloy and chromium oxide having a uniform particle size of several tens of nanometers in a simpler and more efficient manner by using pore-developed porous carbon material particles as a sacrificial template. When the chromium oxide particles or the composite particles of iron oxide-chromium alloy and chromium oxide having a uniform particle size of several tens of nanometers thus obtained may be applied to gas-phase and liquid-phase catalytic reactions, they are advantageous in terms of diffusion of reactants due to the small particle size of several tens of nanometers, high-temperature stability may be obtained due to the characteristic of chromium oxide, and excellent reaction results may be obtained under severe reaction environment.

What is claimed is:

1. A method of preparing particle size-controlled chromium oxide particles, the method comprising:
   Step 1a of preparing porous carbon material particles having a pore volume of 0.3 cm3/g or more;
   Step 2a of mixing a chromium hydrate salt and the porous carbon material particles;
   Step 3a of melt-infiltrating the chromium hydrate salt into pores of the porous carbon material particles at a temperature, at which the chromium hydrate salt is melted; and
   Step 4a of calcining the chromium hydrate salt and the porous carbon material at a high temperature of 700 to 900° C. to form chromium oxide particles, of which particle size is controlled by the pores of the porous carbon material, and also completely removing the porous carbon material by pyrolysis to remain particle size-controlled chromium oxide particles.

2. The method of claim 1, wherein a coefficient of variation (CV) of the particle size of the chromium oxide particles is 0.3 or less.

3. The method of claim 1, wherein an average pore size of the porous carbon material particle in Step 1a is 2 nm to 50 nm.

4. The method of claim 1, wherein an average particle size of the porous carbon material particles in Step 1a is 200 nm~0.2 cm.

5. The method of claim 1, wherein the chromium hydrate salt has a melting point of 30° C.~100° C.

6. The method of claim 1, wherein the porous carbon material is activated carbon, activated charcoal, a synthetic porous carbon support (CMK), or a combination thereof.

7. The method of claim 1, wherein the chromium hydrate salt is melt-infiltrated in an amount of 0.3~3 gram per unit gram (g) of carbon.

8. The method of claim 1, wherein the mixing of Step 2a is performed after mechanical grinding.

9. The method of claim 1, wherein in Step 4a, an average particle size of the chromium oxide particle is 10 nm~50 nm.

* * * * *